Dec. 24, 1940.                C. W. JOHNSON                2,225,996
                         BEER FOAM CONTROL DEVICE
                          Filed Jan. 22, 1938
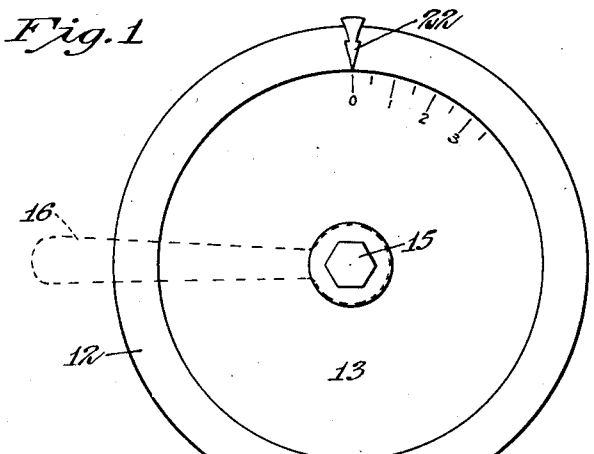
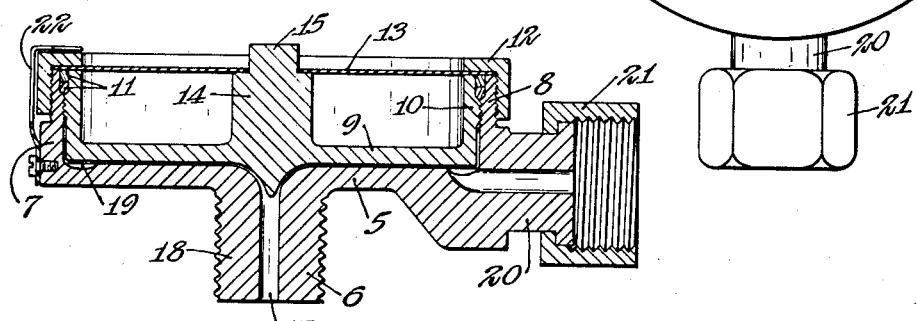
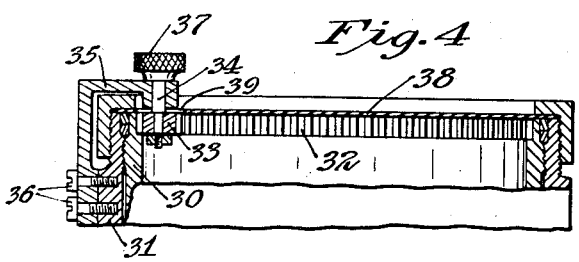
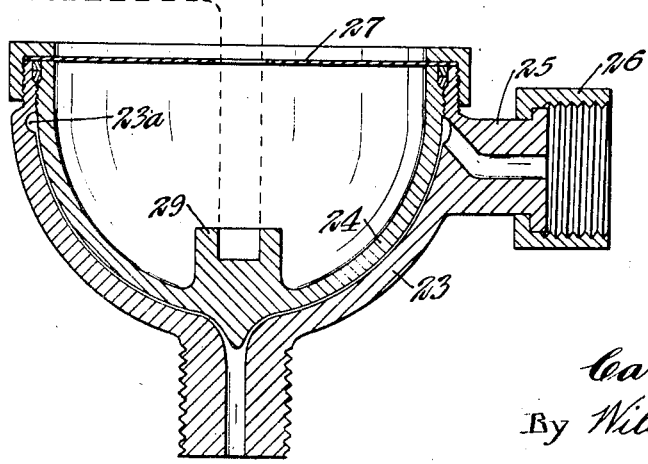
Inventor
Carl W. Johnson
By Williamson & Williamson
Attorneys Patented Dec. 24, 1940

2,225,996

UNITED STATES PATENT OFFICE 2,225,996

BEER FOAM CONTROL DEVICE

Carl W. Johnson, Minneapolis, Minn., assignor to Edith C. Rosander and A. E. Rosander, Minneapolis, Minn.

Application January 22, 1938, Serial No. 186,384

2 Claims. (Cl. 138—46)

This invention relates to devices for controlling the amount of foam on beverages which are maintained in storage containers under gaseous pressure, and is particularly adaptable for use in connection with the dispensing of malt beverages such as beer and ale.

One of the difficulties encountered in the dispensing of malt beverages has been the inability to control the foam or cap which forms on the beer when it is drawn into a glass or other container. It is desirable to maintain beer in a keg under relatively high pressures to prevent the beer from becoming flat, the pressure applied to the liquid serving to retain the natural gases formed in the beer during the fermentation thereof. Heretofore it has been found, however, that beer cannot be placed under very much pressure because it will cause foaming with the result that the person dispensing the beverage must scrape a considerable quantity of foam off the top of the beer in a glass, and that part which is removed is wasted.

It is, therefore, a general object of my invention to provide a device for controlling the amount of foam which is produced in dispensing beverages, such as beer, in order that the beverage may be maintained under relatively high pressure to prevent it from becoming flat, and at the same time permit it to be dispensed with very little foam or cap thereon.

Another object of the invention is to provide a device which can be easily adjusted to meet different pressure conditions in order that a uniform amount of foam will be produced at all times.

A further object of the invention is to provide a device of this general type which is of extremely simple construction and which can be readily cleaned to maintain the original flavor of the beer.

These and other objects and advantages will more fully appear in the following description made in connection with the accompanying drawing, wherein like reference characters refer to similar parts throughout the views, and, in which:

Fig. 1 is a plan view of one form of my device with an operating wrench shown in dotted lines;

Fig. 2 is a vertical section taken approximately through the center of the device shown in Fig. 1;

Fig. 3 is a vertical sectional view of a modified form of construction; and

Fig. 4 is a fragmentary sectional view of a modified type of adjusting means which can be utilized in connection with either of the two embodiments disclosed in the drawing.

In the embodiment shown in Figs. 1 and 2, there is provided a lower disk-like element 5 having a depending apertured pipe or tube connection 6, which, as shown, is externally threaded to permit connection with a container such as a keg of beer. The disk 5 has an upstanding flange 7 whose upper portion 8 is externally and internally threaded. The substantially cup-shaped element thus provided is adapted to receive a second cup-shaped element which includes a disk 9 having an upwardly extending flange 10, a portion of whose outer surface is threaded to engage the threads on the inside of the flange 8. A pair of packing rings 11 are inserted between the two flanges at their upper portions, and the two elements are held together by a retaining collar 12, which is threaded to the external threads on the flange 8. If desired a cover plate or diaphragm 13 may be placed beneath the collar 12 for the sake of appearance. A centrally upstanding post 14 extends from the disk 9 and is provided with a squared or other suitably shaped end 15 to which a wrench 16 may be applied so that the inner cup element can be rotated to some extent to move it toward and away from the disk 5, which forms the bottom of the outer cup-shaped element.

In its operative position the device is intended to be adjusted to a position similar to that shown in Fig. 2, wherein the upper surface of the disk 5 is spaced slightly from the lower surface of the disk 9. This permits beer under pressure to flow in through the aperture 17 in the pipe connection 6 from whence it is directed radially between the disks, this spreading or radial movement of the liquid being assisted by a more or less cone-shaped projection 18 at the under central portion of the upper disk 9. The liquid travels between the disks outwardly to the edges thereof and enters a conduit or trough 19, which extends entirely around the disk 5, and the beer is conducted from the groove 19 through an apertured outlet 20, which is provided with a threaded cap 21 to permit connection with a beer tap or spigot.

When the beer flows from the keg under relatively high pressure it has the tendency to foam, however, the disks 5 and 9 are spaced so closely that, when the foamy liquid is conducted between the adjacent faces of said disks, a large percentage of the bubbles, which constitute the foam, will be broken down into non-foamy liquid. Of course, a certain percentage of the bubbles are preferably retained in the liquid since it is desirable usually to have a certain amount of foam to provide the customary cap on the top of a glass of beer. Of course, the inner cup-shaped element with its disk 9 can be adjusted toward or away from the outer element and its disk 5 until the desired amount of foam is obtained. In order to indicate the degree of adjustment, I have provided a series of graduations on the cover plate 13, as shown in Fig. 1, and a pointer 22 which is suitably secured to the stationary outer cup-shaped element. The relative positions of the parts shown in Fig. 2 are such that the inner movable element is about at its uppermost position against the underside of the cover plate 13. Therefore, any adjustment would be, of course, downwardly from the position shown.

In the embodiment shown in Fig. 3, the same general features are present except that the outer stationary element 23 and the inner movable element 24 are substantially hemispherical. Of course, with a structure of this type, it is possible to secure larger cooperating closely positioned surfaces for breaking down the foam without increasing the diameter of the unit. It will be seen that the method of connecting the two elements is substantially the same and that the outer element 23 is provided with a channel 23a which collects the beer after the foam has been broken down and it is drawn from and through an apertured outlet element 25, which has a threaded connector 26 similar to the connector 21 in the first embodiment. If desired the cover diaphragm may be apertured at its center to permit the insertion of a wrench or operating handle 28 into the socket member 29. This particular variation in the structure from the forms shown in Fig. 2 eliminates the necessity of building up a relatively high central post to the top of the device adjacent the cover diaphragm 27.

In Fig. 4 I have shown a different form of operating means for rotating the inner cup-shaped element 30 relative to the outer element 31. In this view there is shown an internally toothed annular rack 32 which is secured to the inside of the upper edge of the inner cup-shaped element 30, and a pinion 33 mounted upon a pin 34 is supported for rotation in a bracket 35 which is secured by screws 36 to the outer cup element 31. Rotation of the knurled head 37 causes the pinion 33 to rotate the rack 32 and the inner cup 30. The cover plate or diaphragm 38 is provided with a slot 39 partially therearound to provide clearance of the pinion 33 and its pin or shaft 34. This construction affords a much smoother and finer adjustment than that shown in Figs. 2 and 3, and may be substituted if desired.

From the foregoing it may be seen that I have provided a device of extremely few parts, which can be easily operated to effectively control the amount of foam produced when dispensing beer or other liquids having similar characteristics. It can be easily installed in a beer dispensing system, and it in no way affects the qualities of the beverage or other liquid with the exception of its ability to reduce the foam content thereof. With this device beer can be kept at much higher pressures than it has heretofore been found possible, and the taste of the product will not be affected even though it is permitted to stand over a considerable period of time. The pressure can be so maintained that there is no danger of the beer becoming flat.

It will, of course, be understood that various changes may be made in the form, details, proportions and arrangements of the various parts without departing from the scope of my invention.

What is claimed is:

1. A device for controlling the foam on carbonated beverages and similar liquids under gaseous pressure comprising, a relatively stationary flat disk having an inlet aperture in the center thereof, a substantially movable disk movable relative to said stationary disk and having a flat surface area in closely spaced relation to said first mentioned disk to provide a passageway between said disks, said relatively movable disk providing adjustment of the space between said disks to vary the size of said passage, and conduits associated with said disks and at least one of said conduits having its flow axis normal to the faces of said disks.

2. In a device for controlling the foam on carbonated beverages and similar liquids under gaseous pressure, a substantially flat disk, a casing about said disk and supporting the same for movement relative to said casing, a second disk having a relatively flat surface closely adjacent said first disk and having an inlet aperture in its center, and an outlet conduit in communication with the peripheral edge of said first disk and also in communication with the space between said disks.

CARL W. JOHNSON.